United States Patent [19]

Vischer, Jr.

[11] 3,947,100
[45] Mar. 30, 1976

[54] EYEGLASS FRAME
[76] Inventor: Alfred Vischer, Jr., 6111 San Marino Drive, Tucson, Ariz. 85715
[22] Filed: Apr. 22, 1974
[21] Appl. No.: 462,626

[52] U.S. Cl. .............. 351/120; 16/128 A; 351/121; 351/153
[51] Int. Cl.² ...................... G02C 5/22; G02C 5/14
[58] Field of Search ............ 351/41, 111, 120, 153, 351/121, 113; 16/128 A

[56] References Cited
UNITED STATES PATENTS

| | | | |
|---|---|---|---|
| 2,874,609 | 2/1959 | Ducati | 351/113 |
| 3,060,804 | 10/1962 | Rogers | 351/120 |
| 3,271,094 | 9/1966 | Wildermuth | 351/120 |
| 3,841,741 | 10/1974 | Vischer | 351/120 |

Primary Examiner—Paul A. Sacher

[57] ABSTRACT

There is described an eyeglass frame having a molded plastic lens frame which forms one element of each of the hinge assemblies having a vertical axis which connect the temples to the lens frame, which temples are pivotally adjustable about a horizontal axis.

9 Claims, 7 Drawing Figures

U.S. Patent   March 30, 1976   3,947,100
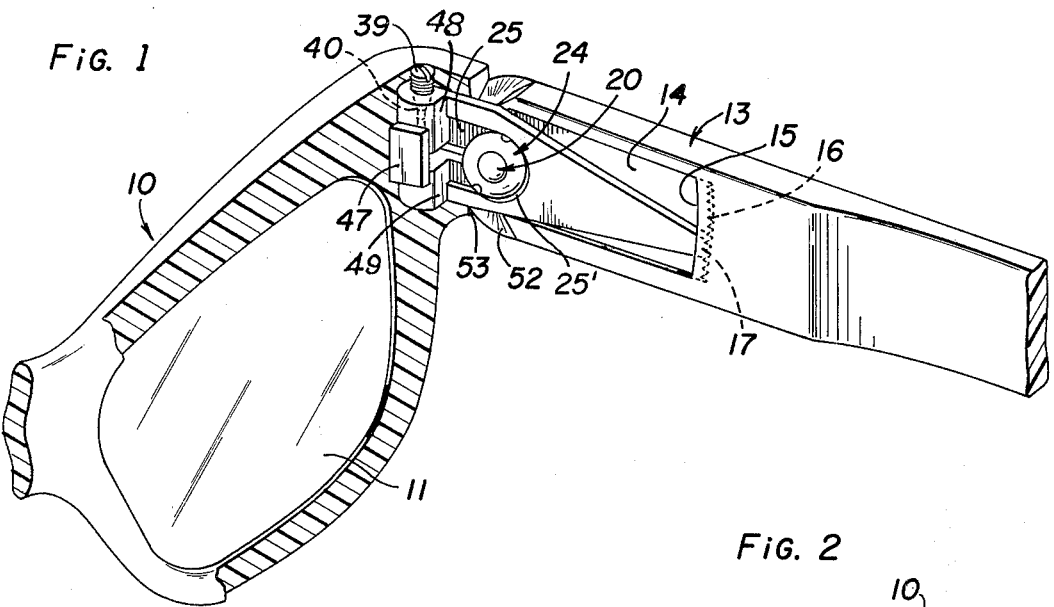
Fig. 1
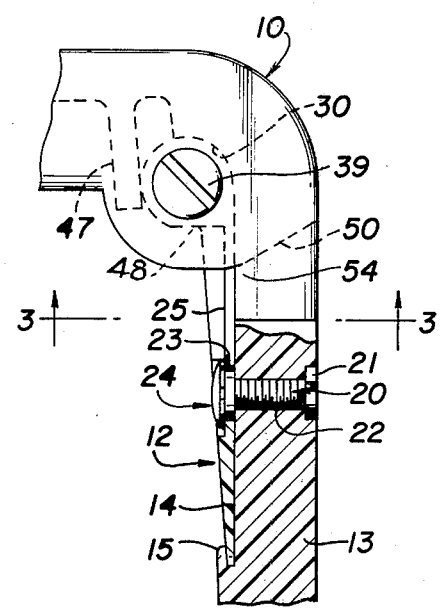
Fig. 2
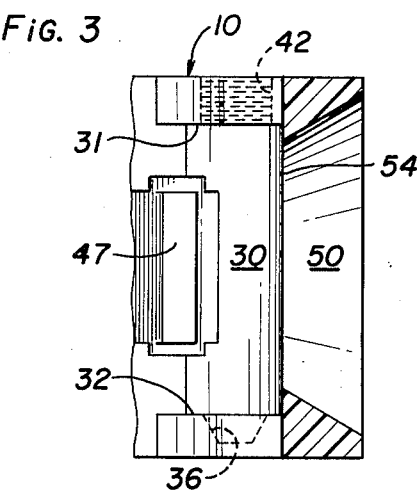
Fig. 3
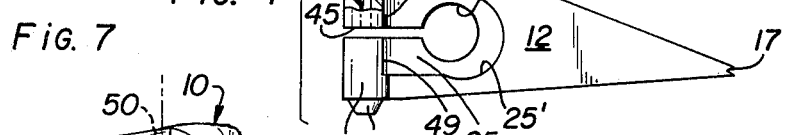
Fig. 4
Fig. 7
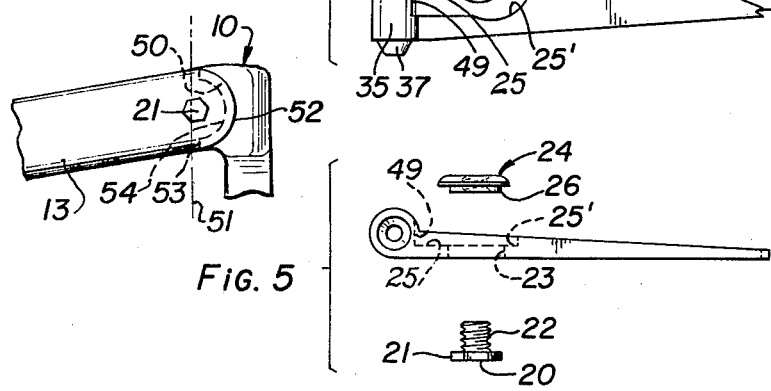
Fig. 5
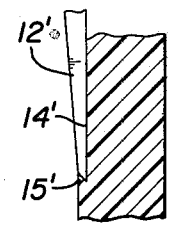
Fig. 6

EYEGLASS FRAME

The present invention relates in general to eyeglass frames and associated hinges, and it relates more particularly to a new and improved hinge construction for pivotally connecting the temple pieces to the lens frame.

The present invention constitutes an improvement over the frame and hinge construction described in my copending application Ser. No. 182,389 filed Sept. 21, 1971, now U.S. Pat. No. 3,841,741 which application is a continuation-in-part of application Ser. No. 100,142 Filed Dec. 21, 1970 now abandoned.

BACKGROUND OF THE INVENTION

The usual eyeglass frame hinge employs a pair of interfitting metal parts pivotally connected together and respectively fixed to the lens frame and to the associated temple piece. The interfitting hinge parts are very small and difficult to handle, are subject to spurious disassembly, and are not readily attachable to associated plastic lens frames and temple pieces, particularly when replacement of the hinge becomes necessary. It would, therefore, be desireable to provide a new and improved eyeglass frame construction wherein the lens frame itself provides better wearing parts of each of the hinge assemblies which connect the temple pieces to the lens frame. It would also be desireable to incorporate in such hinges detent means for holding the temple pieces in the open and closed positions.

Such eyeglasses should also enable adjustment of the pantoscopic and retroscopic angles of the lens in the frame thereby enabling the Doctor to fit faces and optical requirements of various sizes and shapes and to orient bifocal lenses for optimum vision through the lens portions which have the shorter focal length and direct them primarily at the fovea centralis for maximum definition.

SUMMARY OF THE INVENTION

Briefly, there is provided in accordance with the teachings of the present invention new and improved eyeglasses incorporating a hinge construction which may be molded of plastic and which utilizes the lens frame itself as one of the hinge parts. The temple pieces may also be molded plastic parts and the connections thereof to the hinge assemblies enable independent adjustment of the angle at which the lens frame is pantoscopic or retroscopic to the temples, When being used, this novel hinge is not visible to detract from the ornamental appearance of the eyeglasses.

BRIEF DESCRIPTION OF THE DRAWINGS

Further objects and advantages and a better understanding of the present invention may be had by reference to the following detailed description taken in connection with the accompanying drawing, wherein:

FIG. 1 is a fragmentary, perspective view, partly in section, of an eyeglass construction embodying the present invention.

FIG. 2 is a top view of the adjoining portions of the lens frame and the right hand temple piece of the eyeglass construction of FIG. 1;

FIG. 3 is a cross-sectional view taken along the line 3-3 of FIG. 2 with the piece 12 removed;

FIG. 4 is an elevational view, partly in section, of the hinge piece used in the eyeglass construction of FIG. 1;

FIG. 5 is a top view of the hinge piece illustrated in FIG. 4;

FIG. 6 shows an alternate hinge piece construction and

FIG. 7 is a side view taken from the right side of FIG. 2.

DETAILED DESCRIPTION OF THE DRAWINGS

Referring now to the drawing and particularly to FIG. 1 thereof, a lens frame 10 in which the usual lenses 11 are mounted is made of a suitable plastic such as polycarbonate and includes, at the outer ends, recesses pivotally receiving the forward ends of hinge pieces 12 to which respective temple members 13 are removably attached. In FIG. 1 only the right hand half of the lens frame and the associated hinge piece and right hand temple is illustrated. It will be understood, however, that the left hand half of the lens frame and the associated hinge and left hand temple correspond in construction to that shown in FIG. 1, wherefore only that portion of the frame shown in FIG. 1 is described in detail hereinafter.

The inner face of the temple member 13 is provided with an elongated, generally rectangular recess 14 defined at its rearward end by an undercut shoulder 15 overlying a serrated vertical surface 16. As best shown in FIG. 4 the rearward edge of the hinge piece 12 tapers inwardly to one or more pointed teeth as indicated at 17, and this pointed rear end lies beneath the shoulder 15 in engagement with a selected portion of the serrated surface 16 to hold the temple member in an angularly adjusted position in the vertical plane relative to the hinge piece. The hinge piece 12 is fastened to the temple member 13 by means of a bolt 20 having a hexagonal head portion 21 embedded in the outside surface of the temple pices 13 and a threaded shank 22 which extends outwardly from the inner surface of the temple piece 13 near the forward end of the recess 14. A hole 23 in the hinge piece 12 (FIGS. 4 and 5) loosely surrounds the threaded shank portion 22, and a shoulder nut 24 is threaded thereon with a head of the nut 24 located in a recess 25 in the exposed face of the hinge piece 12. The shoulder 26 on the nut 24 has a thickness which is less than the thickness of the adjacent portion of the hinge piece and extends into the hole 23 which is substantially the same in diameter as the shoulder 26 which when entered into 23 removes flexibility of 12 resulting from slot 45. To permit relative transverse movement of the hinge piece and the nut 24 when the nut is loose, an eccentric relief 25' is provided into which the head of the nut 24 can locate.

In order to adjust the retroscopic or pantoscopic angle of the temple member 13 it is merely necessary to loosen the nut 24 on the bolt 20 so the shoulder 26 clears hole 23 in piece 12, to then slide the temple member 13 rearwardly so as to disengage the pointed end 17 of the hinge piece from the serrations 16, and then to pivot the temple member 13 relative to the hinge piece 12 until the temple member is at the desired angle relative to the lens frame 10 so as to properly fit the face and optical requirements of the user. The temple member 13 is then moved forwardly once again to cause the pointed end 17 of the hinge piece to engage the serrated surface 16. The nut 24 is then tightened to lock the temple member 13 in the adjusted position.

As best shown in FIGS. 2 and 3, the lens frame 10 is provided near its right hand outer edge with a rearwardly facing recess defined by a semicylindrical wall portion 30 and top and bottom parallel wall portions 31 and 32. The hinge piece 12 is provided with axially aligned, spaced apart cylindrical end portions 34 and 35 complimentary to the wall surface 30 of the lens frame and these cylindrical end portions of the hinge piece are pivotally disposed within the recess. A generally conical recess 36 is formed in the bottom wall 32 and receives a correspondingly shaped frustoconical depending portion 37 on the cylindrical hinge portion 35. The upper cylindrical hinge portion 34 of the hinge piece 12 is provided with a generally conical recess 38, coaxially disposed relative to the portion 37, and a set screw 39, optionally molded of plastic and having a conically tapered nose portion 40, is threadedly received in a hole 42 in the upper wall portion 31. The tapered nose 40 fits into the recess 38 in the hinge piece 12 to hold the hinge piece in assembled relationship with the frame and also to permit adjustment of the friction between the hinge piece and the frame. The portion 37 of the hinge piece and the set screw 39 thus provide pintles aligned on the axis about which the temple member 13 may be swung between open and closed positions. A locating hole 43 is provided in the hinge portion 34 in coaxial alignment with the recess 38 and the screw 39 has a cylindrical locating nose portion 44 at the lower end to assure alignment of the screw with the threaded hole 42 in the lens frame. Being formed of plastic and because of slot 45 extending from the hole 23 to the forward end of the hinge piece, the hinge piece 12 is somewhat flexible and resilient which permits the cylindrical hinge piece portions 34 and 35 to be compressed together to aid assembly of the hinge piece to the lens frame.

In order to provide a spring tension on the hinge piece for added friction, a generally rectangular tongue 47 is formed integrally with the frame and, as best shown in FIG. 2, presses against the cylindrical portions 34 and 35 of the hinge piece. Also, coplanar flat surfaces 48 and 49 are respectively provided on the rearwardly facing sides of the cylindrical hinge portions 34 and 35 to cooperate with the tongue 47 when the temple is in a closed position against the rear face of the lens frame thereby to act as a detent to hold the temple in the closed position. Similar flats (not shown) may also be provided on the hinge portions 34 and 35 to form a detent to hold the temple member 13 in the fully open position.

In order to provide an attractive appearing eyeglass construction while permitting pivotal adjustment of the temple piece in the vertical plane, the lens frame is provided adjacent to the hinge piece receiving recess with a frustoconical surface 50, and the forward end of the temple piece 13 is complementary shaped thereto as indicated at 52. Moreover, the rearward edges 53 of the lens frame are disposed a short distance forwardly of the vertical diametric plane of the recess 50 whereby the spacing between the axis of the screw 20 and the central axis of the conical portion 52 together with the flexibility of the hinge piece, provide a detent action between the interfitting conical portions, thereby to snap and hold the temple in the open position. The vertical diametric plane of the recess 50 is the vertical plane which extends through the center of revolution of the frustoconical surface 50 and is indicated in FIG. 7 by the phantom line 51. The inner arcuate edge 54 of the recess 50 is rounded or chamfered to provide a smooth action when the temple portion 52 slides thereover as the temple piece is snapped into the fully opened position. When fully open, the outer arcuate edges of the surfaces 50 and 52 are engaged so as to be invisible from a short distance away.

Referring to FIG. 6 there is shown a modified embodiment of the invention wherein the rearwardly extending portion of the hinge piece lies flush with the inner face of the temple. As there is shown the undercut shoulder, identified as 15', extends at an angle and the rear end of the hinge pieice 12' is also tapered so as to fit thereunder. The rear end of the hinge piece 12', like the hinge piece 12, is pointed and the tapered shoulder 15' is serrated to receive the pointed end at a selected adjustable position.

While the present invention has been described in connection with particular embodiments thereof, it will be understood by those skilled in the art that many changes and modifications may be made without departing from the true spirit and scope of the present invention. Therefore it is intended by the appended claims to cover all such changes and modifications which come within the true spirit and scope of this invention.

What I claim is:

1. An eyeglass construction, comprising
    a lens frame having near one end thereof an elongated recess defined by a semicylindrical wall and transverse end walls,
    a flexible hinge piece having a generally cylindrical forward portion disposed in said recess with the top and bottom ends thereof lying respectively adjacent said transverse end walls,
    said top and bottom ends and said transverse end walls having mutually complementary interfitting pintles and recesses for holding said hinge piece in assembled relationship with said lens frame,
    said hinge piece having a rearwardly extending flat portion provided with a hole therethrough,
    a temple member,
    means extending through said hole into said temple member for pivotally securing said temple member to said hinge piece,
    said hinge piece being provided with a slot extending from said hole to the forward end of said hinge piece thereby splitting said cylindrical forward portion into spaced apart axially aligned cylindrical portions to ease insertion of said portions into said recess; and
    a flexible tongue extending rearwardly from said lens frame engaging said cylindrical forward portion of said hinge piece,
    said tongue being resiliently biased against said cylindrical forward portion.

2. An eyeglass construction according to claim 1 wherein
    said tongue, said semicylindrical wall and said transverse end walls are integral plastic portions of said lens frame.

3. An eyeglass construction according to claim 2 wherein
    said cylindrical foreward portion of said hinge piece is provided with a flat against which said tongue presses when said temple member is in a closed position against said lens frame to hold said temple member in said closed position.

4. An eyeglass construction according to claim 1 wherein
    said hinge piece is an integral plastic part.

5. An eyeglass construction according to claim 4 wherein
one of said pintles is a threaded member threadedly received in an opening in said lens frame, and
one of said complementary recesses being aligned with said opening in said lens frame.

6. An eyeglass construction according to claim 5, wherein
the other of said pintles is integral with one end of said cylindrical foreward portion of said hinge piece, and
the other of said complementary recesses is provided in the other end of said cylindrical foreward portion of said hinge piece.

7. An opthalmic mounting, comprising
a plastic lens frame,
a pair of temple members each having a forward end portion,
a pair of hinges respectively connecting said temple members to said lens frame to permit said temple members to be swung about substantially vertical axes between open and closed positions,
said lens frame having molded therein at the remote sides thereof rearwardly facing recesses defined by a frustoconical surface of said lens frame having an arcuate external edge lying in a substantially vertical plane,
said forward end portions of said temple members each having a frustoconical portion complimentary to said recess defining surface and tightly positioned in said recess when said temple members are in the fully open extended positions thereby to provide arcuate lines of demarcation between the outside forward edges of said temple members and said lens frame, and
said hinges each having a flexible, resilient portion connecting said lens frame to the associated temple member which flexes to permit said temple members to be swung into and out of said fully open positions.

8. An opthalmic mounting according to claim 7 wherein each of said hinges comprises
a first portion pivotally connected to said lens frame, and
a flat elongated flexible, resilient portion extending rearwardly from said first portion and lying against the inner face of the associated temple member,
said flat portion lying in a plane perpendicular to the axis of generation of said frustoconical surface.

9. An opthalmic mounting according to claim 8 comprising
means connecting said temple members to said hinges to permit pivotal movement of said temple members about said axis of generation relative to said lens frame.

* * * * *